United States Patent
Friedrich et al.

(10) Patent No.: US 11,438,433 B1
(45) Date of Patent: Sep. 6, 2022

(54) PROGRESSIVE OBJECT REFRESHES IN CONTENT DELIVERY NETWORKS

(71) Applicant: Disney Enterprises, Inc., Burbank, CA (US)

(72) Inventors: Eric C. Friedrich, North Easton, MA (US); Luis A. Cruz, Queens, NY (US); Robert Gerard Colantuoni, Hanahan, SC (US); Jeffrey Edwin Grubb, South Amboy, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/518,764

(22) Filed: Nov. 4, 2021

(51) Int. Cl.
*H04L 67/5682* (2022.01)
*H04L 65/80* (2022.01)
*H04L 65/612* (2022.01)

(52) U.S. Cl.
CPC ...... *H04L 67/2852* (2013.01); *H04L 65/4084* (2013.01); *H04L 65/80* (2013.01)

(58) Field of Classification Search
CPC .. H04L 65/4084; H04L 65/80; H04L 67/2852
See application file for complete search history.

(56) References Cited

U.S. PATENT DOCUMENTS

| | | | |
|---|---|---|---|
| 9,509,764 B1* | 11/2016 | Kolam | H04L 67/2852 |
| 11,218,561 B1* | 1/2022 | Mondal | H04L 43/08 |
| 2006/0112176 A1* | 5/2006 | Liu | H04L 61/6009 709/245 |
| 2014/0047085 A1* | 2/2014 | Peters | G06Q 30/0605 709/221 |
| 2020/0327149 A1* | 10/2020 | Brennenstuhl | G06F 16/2365 |

* cited by examiner

Primary Examiner — Jonathan A Bui
(74) Attorney, Agent, or Firm — Patterson + Sheridan, LLP

(57) ABSTRACT

The embodiments herein describe a CDN that uses revalidation to force edge servers to refresh their cached objects (i.e., download new copies of the objects from the origin data center). Revalidation can be used by edge servers to determine whether an object currently cached at the edge servers has been updated or changed in the origin data center. The embodiments herein leverage revalidation to perform a forced refresh to force the edge servers to refresh their cached object, regardless whether those cached objects match the objects stored in the origin data center. A forced refresh can be used when there is a network connection that may have caused the cached objects to become corrupted. Moreover, the forced refresh can be performed in batches so as not to overwhelm the network and computing resources in the CDN.

20 Claims, 5 Drawing Sheets

| | 405A | 410A | 405B | 410B | 405C | 410C | 405D | 410D |
|---|---|---|---|---|---|---|---|---|
| | Etag Regex | Proportion of Content | Etag Regex | Proportion of Content | Etag Regex | Proportion of Content | Etag Regex | Proportion of Content |
| | "0$" | 6.25% | "[0-4]$" | 31.25% | "[0-8]$" | 56.25% | "[0-9][A-C]$" | 81.25% |
| | "[0-1]$" | 12.5% | "[0-5]$" | 37.5% | "[0-9]$" | 62.5% | "[0-9][A-D]$" | 87.5% |
| | "[0-2]$" | 18.75% | "[0-6]$" | 43.75% | "[0-9]A$" | 68.75% | "[0-9][A-E]$" | 93.75% |
| | "[0-3]$" | 25% | "[0-7]$" | 50% | "[0-9][A-B]$" | 75% | "[0-9][A-F]$" | 100% |

PROGRESSIVE OBJECT REFRESHES IN CONTENT DELIVERY NETWORKS

BACKGROUND

A content delivery network, or content distribution network (CDN), is a geographically distributed network of edge servers and their origin data centers. Their goal is to provide high availability and performance by distributing the service spatially relative to end users. CDNs came into existence to mitigate performance bottlenecks as the Internet was becoming a mission-critical medium for people and enterprises. Since then, CDNs have grown to serve a large portion of the Internet content today, including web objects (text, graphics and scripts), downloadable objects (media files, software, documents), applications (e-commerce, portals), live streaming media, on-demand streaming media, and social media sites.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 4 illustrates using object tags to divide content into batches, according to one embodiment.

DETAILED DESCRIPTION

Figure 1:
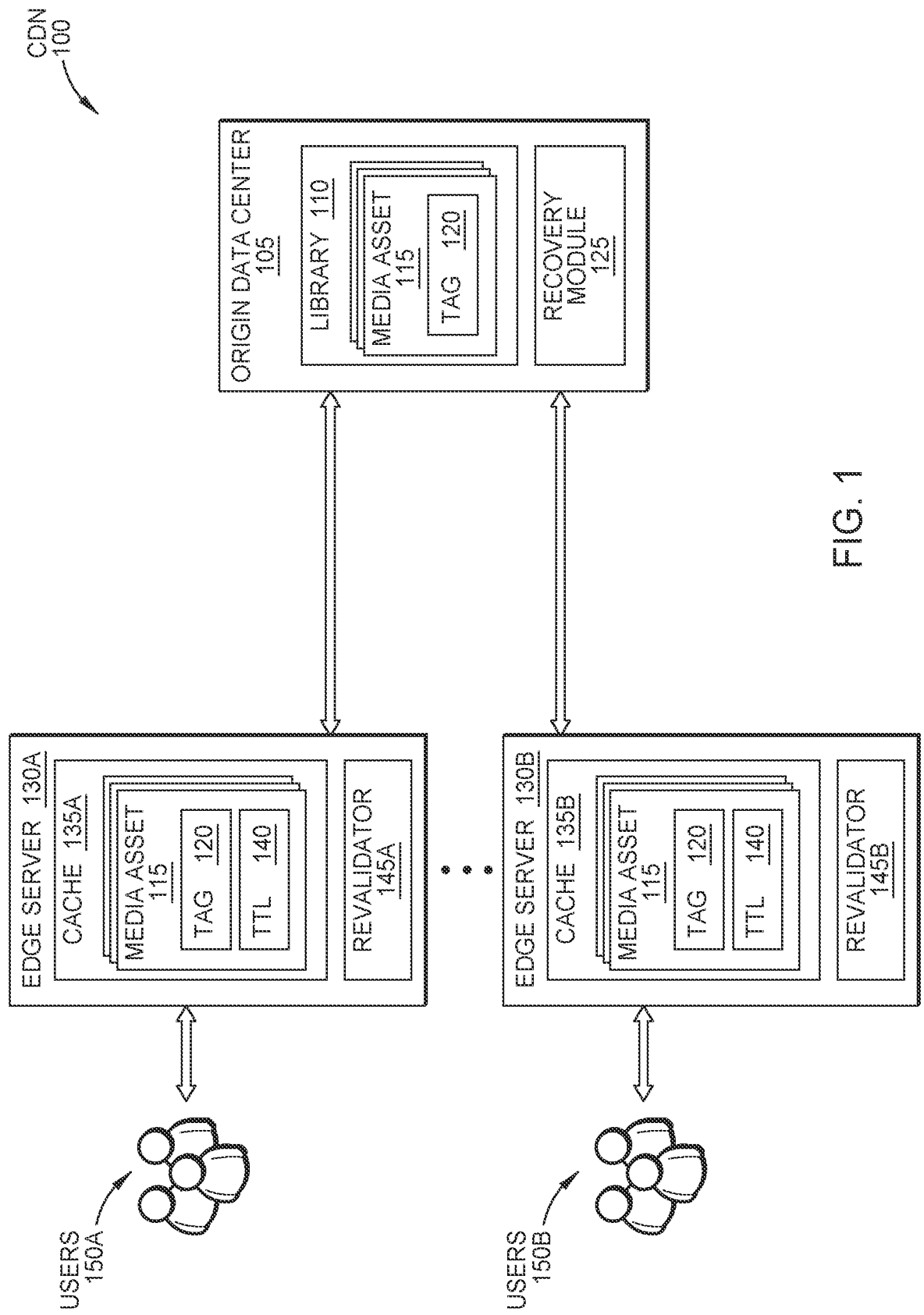
FIG. 1 is a block diagram of a CDN that performs forced refresh using revalidation, according to one embodiment.

The embodiments herein describe a CDN that uses revalidation to force edge servers to refresh their cached objects (i.e., download new copies of the objects from the origin data center). An edge server (also referred to as a proxy server) responds to user requests for data (referred to generally as an "object") by retrieving the object from an origin data center and caching the object. The edge server can then respond to future user requests for that object without having to re-download the object from the origin data center. If user demand for the object evaporates, the edge server will no longer cache the object (i.e., the edge server deletes the object) but the object remains stored in the origin data center. If user demand remains high, then the edge server continues to cache the object. However, the origin data center may update the object, thereby rendering the object cached in the edge servers stale. As such, the edge servers can periodically perform what is referred to as a revalidation process to ensure its copy of the object matches the most up-to-date version of the object stored at the origin. If not, the edge server can download and cache the updated version of the object.

As mentioned above, revalidation can be used by edge servers to determine whether an object currently cached at the edge servers has been updated or changed in the origin data center. For example, a cached news article may be updated as a fluid situation changes, or to correct an error in the article. The updated article is stored in the origin data center. The edge servers can use revalidation to check whether its cached copy of the news article still matches the article stored at the origin, and if not, download a new copy of the article (i.e., refresh the object).

The embodiments herein leverage revalidation to perform a forced refresh to force the edge servers to refresh their cached object, regardless of whether those cached objects match the objects stored in the origin data center. A forced refresh can be used when there is a network connection that may have caused the cached objects to become corrupted. For example, when the edge servers first retrieve an object from the origin, network connection issues may cause the cached object to be missing data, or data may be rearranged relative to the copy of the object stored at the origin. It is often difficult, if not impossible, to determine which of the cached objects are corrupt, given that the edge servers can cache hundreds of thousands or millions of different objects. Furthermore, the primary entity that controls the origin data center may rely on third parties to operate the edge servers. Thus, the primary entity may not have access to the edge servers, and thus, cannot tell which objects are, or are not, corrupt.

To recover from the cached objects becoming corrupted, the embodiments herein force a refresh by changing tags corresponding to the objects. When an object is stored in the origin data center, it is assigned a tag (e.g., a timestamp or hash of the underlying data) that uniquely identifies this object. When the object is updated at the origin, its tag is also modified. Thus, when an edge server sends revalidation request using the old tag of the object, the origin data center informs the edge server that the tags do not match, and in response, the edge server downloads a fresh copy of the object along with its updated tag. To force a refresh, the origin data center can sua sponte change the tags of the objects, even if these objects have not been updated. When the edge servers perform revalidation, none of the tags will match, thereby triggering the edge servers to download (again) the objects to replace any cached objects that may be corrupt.

Because this process can be used to refresh a lot of the cached objects (or all of the cached objects) in the edge server, this can cause a significant strain on the network connecting the origin data center to the edge servers. To control or cap this strain, the origin data center may perform the forced refresh in batches by changing only a portion of the tags at a time. For example, the origin data center may change only one fourth of the tags every week so that over a four week period all the cached objects in the edge server are forcibly refreshed. Advantageously, using the embodiments herein, the CDN can recover from small or large data corruption incidents by performing a forced refresh in a controlled manner that does not overwhelm the network.

FIG. 1 is a block diagram of a CDN 100 that performs forced refresh using revalidation, according to one embodiment. Generally, the CDN 100 includes an origin data center 105 that stores master copies of media assets 115 (or more generally, objects) which are cached at edge servers 130 distributed at various geographical locations. The edge servers 130 service requests for the media assets 115 by the users 150. For example, the edge server 130A may service requests initiated by users 150A in one geographic region while the edge server 130B services requests initiated by users 150B in a different geographic region. While two edge servers 130 are shown, the CDN 100 can include any number of edge servers 130. Further, the CDN 100 can have multiple origin data centers 105. For example, one group of edge servers 130 (e.g., the edge servers in a first country) may use one origin data center 105 while a different group of edge servers 130 (e.g., servers in a second country) use a different origin data center 105.

The embodiments herein are described in the context of a streaming media environment where the users 150 request media asset 115 (e.g., a movie, television show, video clip, news article, etc.), but can be applied to CDNs that provide any kind of object (e.g., applications, web objects, live streams, etc.). In general, when receiving a user request, the edge server 130 checks to see whether the requested media asset 115 is in its own cache 135, and if so, provides the asset 115 to the user 150. But if not, the edge server 130 requests a copy of the media asset 115 from the origin data center 105. The edge server 130 then caches the media asset 115 for a period of time so that the next time a user 150 requests the asset 115, the edge server 130 can provide the asset 115 without again downloading it from the origin data center 105.

In this example, the origin data center 105 includes a library 110 that stores the media assets 115. The origin data center 105 (also referred to as the origin 105) can include one or more computing systems (e.g., servers) that store the library 110. In one embodiment, the library 110 stores all the media assets 115 in the CDN 100. For example, if the origin 105 is owned by a media company, the origin 105 may store all the media assets 115 that are being made available to the user 150 as part of, e.g., a subscription-based (or free) streaming service. The edge servers 130, in contrast, may store only a portion of the media assets 115 available to the users 150. Further, each edge server 130 may store a different portion of the media assets 115, depending on the requests made by the users 150 in its corresponding geographical location. That is, the edge server 130A may store a different subset of the media assets 115 in its cache 135A than the edge server 130B does in its cache 135B.

In this embodiment, each media asset 115 is assigned a tag 120 when first being stored in the library 110. The tag 120 (also referred to as an Etag) may be a timestamp indicating when the media asset 115 was stored (or updated) or a hash that is derived from the underlying data in the media asset 115. In any case, the tag 120 may be unique from all the other tags 120 of the media assets 115 in the CDN 100.

The tags 120 can be used to revalidate the media assets 115 cached at the edge servers 130. When caching the media assets 115, the edge servers 130 store a time to live (TTL) 140 to each media asset 115. The TTL 140 determines a time (or a counter) when the edge server 130 performs a revalidation process for the media asset 115 to determine whether it is stale and should be refreshed. For example, when the TTL 140 expires, a revalidator 145 (e.g., a software application) in the servers 130 sends the tag 120 to the origin 105 which in turn checks whether that tag 120 matches the tag 120 for the copy of the media asset 115 stored in the library 110. If so, the origin 105 informs the edge server 130 that the tags 120 match, and in response, the edge server 130 may reset the TTL 140 for the media asset 115. If the tag 120 in the edge server 130 does not match the tag 120 in the origin 105, the edge server 130 refreshes the asset 115 by downloading or receiving the media asset 115 from the origin 105 along with its new tag 120.

As mentioned above, the revalidation process can be leveraged to perform a forced refresh on some or all of the media assets 115 cached in the edge servers 130. To do so, the origin 105 includes a recovery module 125 (e.g., a software application or code) that changes the tags 120 of some or all of the media assets 115 in the library. Unlike other implementations of revalidation where the tags 120 are changed only when the underlying media asset 115 has changed or been updated, the recovery module 125 changes the tags 120 of at least some of the media assets 115 even if those assets 115 have not changed. Advantageously, this permits the CDN 100 to update the cached media assets 115 in the edge servers 130 without having to evaluate these copies to determine which ones are corrupted due to, e.g., a network error.

For example, when a cached media asset 115 becomes corrupted, the edge server 130 or the origin 105 may be unable to tell. Because revalidation is performed by comparing the tags 120, the underlying media asset 115 in the edge server 130 may be corrupted while the tag 120 is not. Thus, performing a normal revalidation process will not detect the error. Further, manually inspecting the media assets 115 may be too time consuming and difficult given the amount of data that is typically cached in modern CDNs 100. Instead, the recovery module 125 can modify the revalidation process to force the edge server 130 to update all (or a portion) of their cached media assets 115 by changing the corresponding tags 120 in the origin. Thus, when the revalidators 145 perform revalidation when the TTLs 140 expire, the local stored tags 120 will not match the changed tags 120 in the origin 105. In response, the edge server 130 will refresh the cached media assets 115, thereby replacing any corrupted media assets 115.

While the term edge server 130 is used, each edge server 130 can be a collection of servers at a particular location. For example, depending on the size of the CDN 100, each edge server 130 can itself be a data center comprising a plurality of computing systems.

Further, while not discussed in detail herein, the edge servers 130 or the origin 105 can establish eviction rules for when the edge server 130 evicts (or deletes) a media asset 115 from its cache 135. These rules can be based on the number of user requests, a rate of user requests, a time threshold, and the like. The revalidation process may be separate from the eviction process. After a media asset 115 is evicted/deleted, if the edge server 130 receives another user request for the asset 115, the edge server 130 again downloads the asset 115 from the origin 105.

While not shown, the origin data center 105 and the edge servers 130 can include at least one processor and memory for storing and executing software applications such as the revalidator 145 and the recovery module 125. Moreover, in another embodiment, the revalidator 145 and the recovery module 125 may be stored in computing systems that are separate from the edge servers 130 and the origin data center 105.

Figure 2:
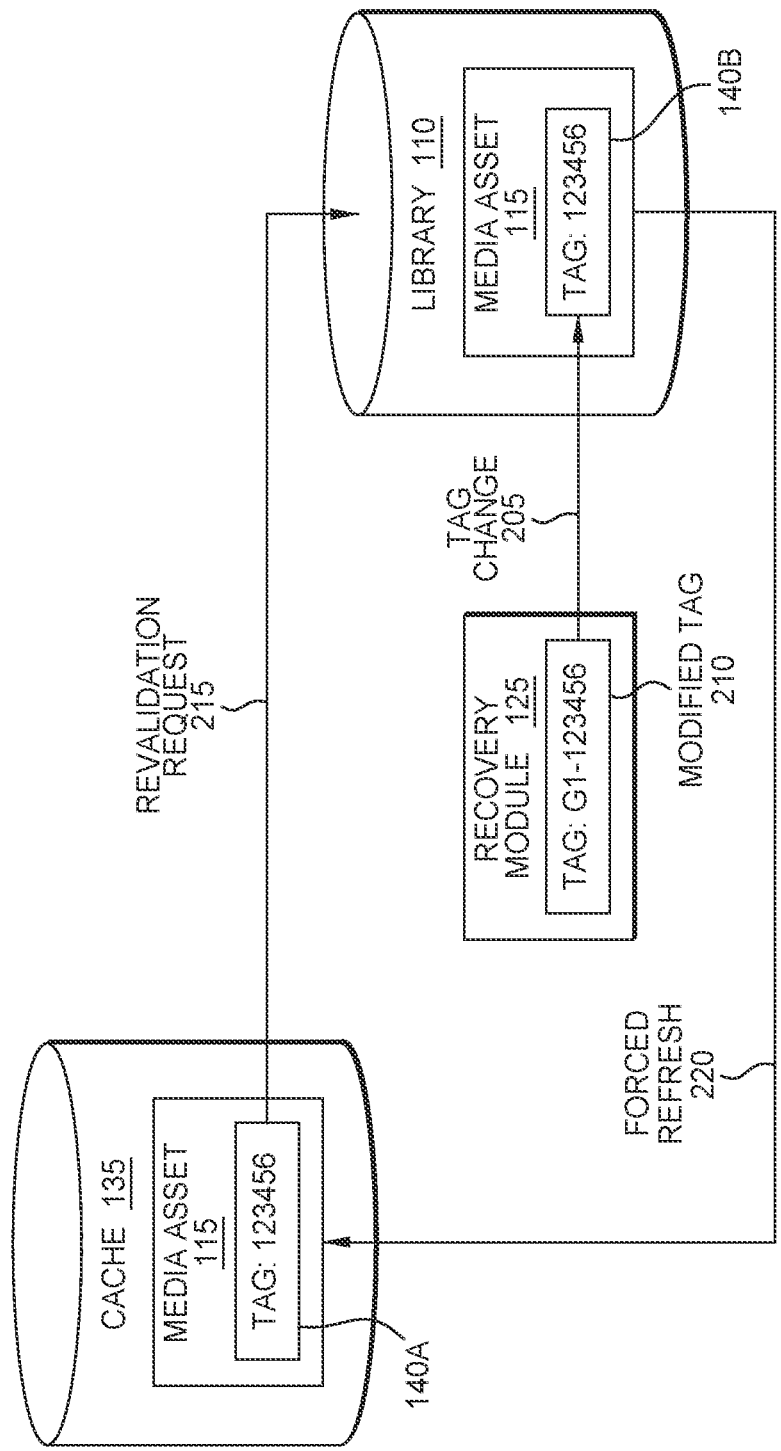
FIG. 2 illustrates performing a forced refresh during revalidation, according to one embodiment.

FIG. 2 illustrates performing a forced refresh during revalidation, according to one embodiment. FIG. 2 illustrates a portion of the CDN 100 in FIG. 1, namely the cache 135 of an edge server, the recovery module 125 in an origin data center, and the library 110 in the origin data center.

Whether automatically or in response of a system administrator, the recovery module 125 begins the forced refresh by performing a tag change 205. As shown, the recovery module 125 generates a modified tag 210 which it then uses the modify the original tag 140B stored in the library 110. In this example, the recovery module 125 adds the prefix "G1" to the original tag "123456" so that the modified tag 210 for that media asset 115 is now "G1-123456". Again, the recovery module 125 modifies the tag 1406 even though the underlying media asset 115 may not have changed or otherwise been updated. In another example, the recovery module 125 adds or changes a suffix of the original tag to result in the modified tag 210.

Sometime later, the revalidator in the edge server determines to execute a revalidation process for the media asset 115 stored in the cache 135, for example, when a TTL for the media asset 115 expires. A revalidation request 215 is transmitted from the edge server that includes the tag 140A stored in the cache 135. As shown, the value of the tag 140A (i.e., "123456") matches the original tag 140B stored in the library 110. However, this tag 140B was changed to the modified tag 210 by the recovery module 125 during the tag change 205. Thus, the origin informs the edge server that the tag 140A does not match the modified tag 210 now stored in the library 110. In response, the edge server performs a forced refresh 220 where the edge server downloads the media asset 115 from the library 110 and stores it in the cache 135, replacing the copy of the media asset 115 previously stored in the cache 135. If the cached media asset 115 was corrupt, then the forced refresh 220 replaces the corrupt copy with an uncorrupted copy. If the cached media asset 115 was not corrupt, then the forced refresh 220 simply replaces the media asset 115 with the same copy.

In one embodiment, the revalidation request 215 includes a "If-None-Match: <etag>" HTTP request header, indicating a conditional request to the origin. If the value of the etag in the If-None-Match header matches the current value of the tag in the library 110, the origin responds positively with a "304 Not Modified" indicating the content is up to date. Otherwise, if the tags do not match, the origin responds with a "2000K" and sends a new copy of the object. This HTTP process can be used during both a normal revalidation request as well as a forced refresh 220.

Further, as part of the forced refresh 220, the modified tag 210 is stored in the cache 135. Thus, when the edge server initiates another revalidation process for the asset, the tag in the edge server will match the tag in the origin since both now store the modified tag 210—i.e., "G1-123456". This assumes, of course, that the media asset 115 has not been updated in the origin, which would change the tag being stored in the library 110. If the tags did not match, then the edge server performs a "normal" refresh rather than a forced refresh 220 since it is in response to a change in the underlying media asset 115 stored at the origin rather than part of a data recovery process to correct errors in the media assets 115 stored at the edge servers.

Figure 3:
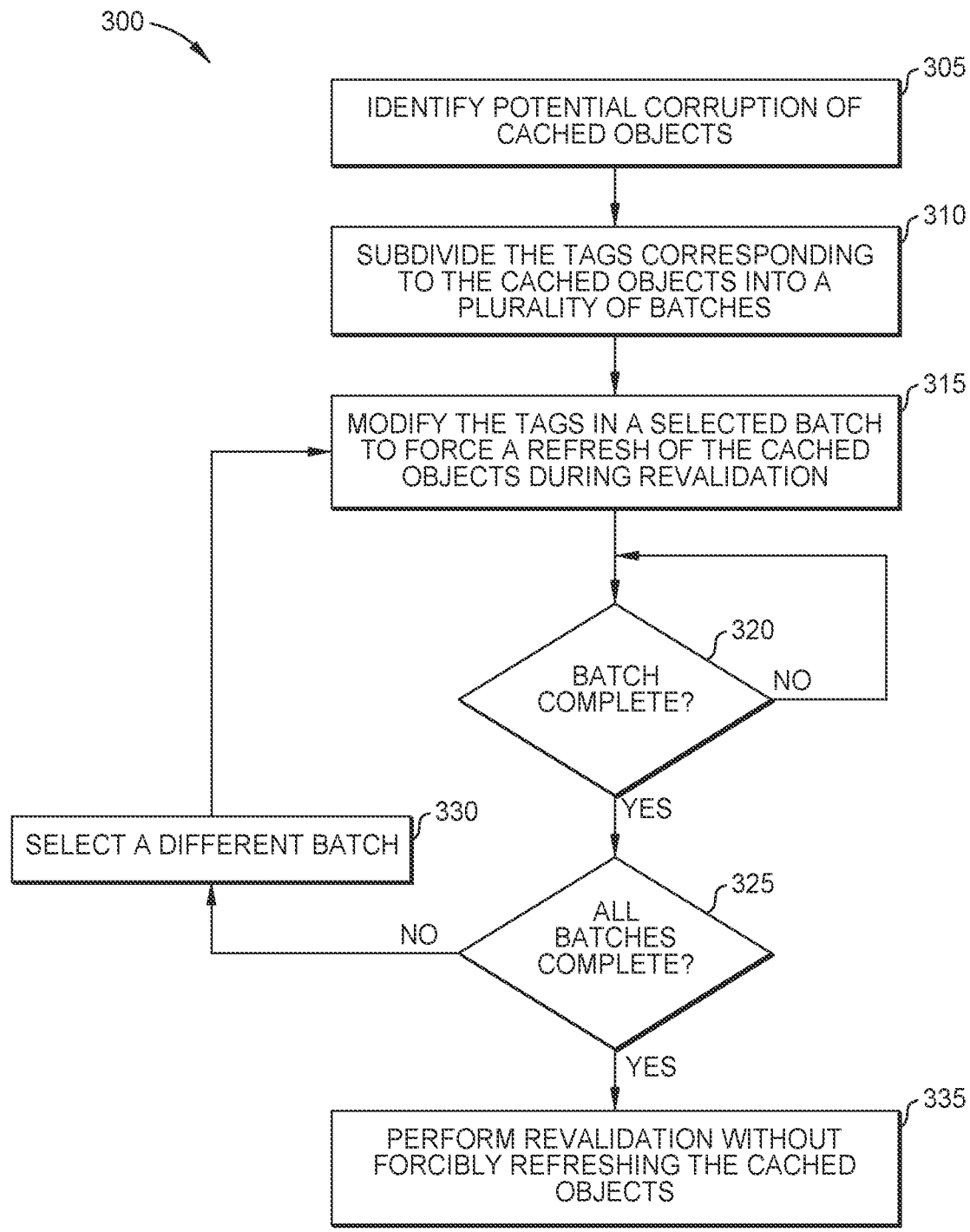
FIG. 3 is a flowchart for performing a forced refresh in batches, according to one embodiment.

FIG. 3 is a flowchart of a method 300 for performing a forced refresh in batches, according to one embodiment. At block 305, the recovery module (e.g., the recovery module 125 in FIGS. 1 and 2) identifies potential corruption of cached objects at the edge servers of a CDN. In one embodiment, corrupted objects may be detected based on user complaints that a retrieved object has an error, e.g., a media asset has poor quality or is missing scenes, or a downloaded software application will not install. In another embodiment, an automatic quality control application may randomly retrieve and inspect cached objects at edge servers to determine whether they have any errors.

In another embodiment, a network monitoring application may monitor a state of the network used to transmit the objects from the origin data center to the edge servers. If the network monitoring application detects an error in the network (e.g., dropped packets, loss of connection, etc.) which may result in the objects being corrupted when being transmitted across the network, the application can inform the recovery module. In this example, the recovery module can identify a situation where the objects were corrupted without any person or application having to inspect the objects—i.e., the recovery module may assume that objects were corrupted due to the network error and perform a forced refresh.

In another embodiment, the recovery module may initiate a forced refresh in response to a predefined time period. For example, a forced refresh may be performed once a year, regardless of whether any potential corruption has been identified in the cached objects. In another embodiment, the forced refresh may also be manually triggered on all or a subset of content.

At block 310, the recovery module subdivides the tags corresponding to the cached objects into a plurality of batches. In one embodiment, the recovery module decides to perform a forced refresh on all of the objects in the CDN. In that case, the recovery module may subdivide the tags for these objects into multiple batches, where a force refreshed is performed on each batch at different times. However, in another embodiment, the recovery module performs a forced refresh on only a portion of the objects in the CDN. For example, the recovery module may exclude some of the objects, which is discussed later in FIG. 5. In another example, the recovery module may know that only a portion of the objects were corrupted (e.g., only a particular type of object was corrupted) and perform a forced refresh only on those objects. In any case, the recovery module identifies the tags corresponding to those objects and divides the objects into batches using the tags.

FIG. 4 illustrates using object tags to divide content into batches, according to one embodiment. That is, chart 400 illustrates data regarding the tags that can be used to divide the objects into different batches. The columns 405A-D define different ranges of the last value in the tags (e.g., a Etag Regex) of the objects. In this example, the tags are a series of hexidecimal numbers, where each value has a value of 0-9 or A-F—e.g., "1F05027D9245." In this example, the last value (e.g., the value of the least significant bit) is used to subdivide the tags, and thus, subdivide the objects into different batches. While the least significant bit is described in this example, in another embodiment, the most significant bit (or bits) can be used instead.

The first row of column 405A represents all tags that end with the value 0, the second row of column 405A represents all tags that end with the value 0 or 1, the third row of column 405A represents all tags that end with the value 0, 1, or 2, and the fourth row of column 405A represents all tags that end with the value 0, 1, 2, or 3. Similarly, the first row of column 405B represents all tags that end with the value 0, 1, 2, 3, or 4, the second row of column 405B represents all tags that end with the value 0, 1, 2, 3, 4, or 5, and so forth until reaching the last row in column 405D that represents all tags that end with the value 0, 1, 2, 3, 4, 5, 6, 7, 8, 9, A, B, C, D, E, or F (i.e., all the tags).

The columns 410A-D indicate the proportion of the content (i.e., the proportion of the objects) in the CDN with those tags. For example, according to the first row of column 410A, 6.25% of the objects in the CDN have tags that end with the value 0. According to the second row of column 410A, 12.5% of the objects in the CDN have tags that end with the values 0 or 1, and so forth. Thus, the chart 400 represents a CDN where the last value of the tags equally distributes the objects or content in the CDN.

Using chart 400, if the recovery module wants to divide the objects into four batches, then it can select all the tags that have values that end with either 0, 1, 2, or 3 into a first batch, select all the tags that have values that end with either 4, 5, 6, or 7 into a second batch, select all the tags that have values that end with either 8, 9, A, or B into a third batch, and select all the tags that have values that end with either C, D, E, or F into a fourth batch. According to the chart 400, these four batches would each include 25% of the content in the CDN. Thus, to force a refresh on only the first batch, the recovery module can change all tags that end with either 0, 1, 2, or 3 to a different value (e.g., adding a prefix to these tags, such as "G1" as shown in FIG. 2) while leaving the tags that end in any other value (i.e., 4-9 or A-F) unchanged. As a result, when the edge server sends a revalidation request for an object with a tag ending with either 0, 1, 2, or 3, the tags will not match and the edge server will download a new copy of the corresponding objects. However, when the edge server sends a revalidation request for an object with a tag ending with any other value (assuming the object has not been modified), the tags will match and the edge server will not refresh the object. In this manner, the amount of objects being forcibly refreshed using revalidation can be controlled by dividing them into batches. If the system administrator is worried about overloading the network, the batches can be smaller (e.g., each potential value of the last digit in the tag can be a different batch).

Using the last value of the tag to subdivide the objects into different batches is just one example. If more granularity is desired, the last two values of the tags could be used. Or the first value of the tags could be used. In one embodiment, the recovery module may use whatever values provide an equal distribution of the tags. For example, by evaluating the tags, the recovery module or a system administrator may determine that the last values of the tags do not equally distribute the content in contrast to what is shown in chart 400. For example, 11.7% of the content may have tags with a last value of 0 while the other remaining last values equally distribute the remaining tags (i.e., 5.9% of the content has tags with a last value of 1, 5.9% of the content has tags with a last value of 2, and so forth). To get 17 equal batches, the recovery module may assign tags with a second to last value of 0-7 and a last value of 0 to one batch (which would be 11.7/2=5.9% of the content assuming the content with the last tag value of 0 is evenly distributed) and tags with a second to last value of 8-F and a last value of 0 to a second batch (which would be another 5.9% of the content). The other fifteen batches could be formed using the remaining potential last values of the tags (i.e., values 1-F). Thus, the recovery module can use any number of the values in the tag (and any combination) to form the batches.

Further, the recovery module does not need to ensure each batch covers an equal amount of the content in the CDN. For example, three batches each may include 20% of the content while the fourth batch has 40% of the content. The recovery module may perform the forced refresh on the fourth batch during a time when the network traffic between the origin and edge servers is low, while the other three batches can be performed during peak or normal hours.

Returning to the method 300, at block 315, the recovery module modifies the tags in a selected batch to force a refresh of the cached objects during revalidation. As mentioned above, the recovery module may modify the tags for only that batch while not modifying the tags for the objects in other batches. For example, the recovery module can add additional prefixes to the tags, add additional suffixes to the tags, or otherwise change the tags so that they do not match the tags of the cached objects in the edge servers. While the embodiments herein are not limited to a prefix, the recovery module may alter the tags so that the objects are not inadvertently refreshed when executing a subsequent batch. For example, if the recovery module were to change the last value of the tags (e.g., the suffix), and the last value is being used to divide the tags into batches, then these objects may needlessly be updated when doing a subsequent batch. For example, when performing a forcible refresh on objects with tags ending in the value of "0", if the recovery module changes these tags to have a last value of "1", then these objects would be forcibly refreshed again when doing the next batch of the objects with tags with a last value of "1". Adding values to the prefix rather than changing the last values (e.g., the suffix) is a simple way to avoid this problem as well as ensure that the tags are still unique. Further, the new prefix can be an easy way to identify which objects have been refreshed and which have not (i.e., objects that have shorter tags).

At block 320, the recovery module determines when the selected batch is complete—i.e., the objects in that batch have been forcibly refreshed. In one embodiment, the recovery module waits until the TTL for the objects has elapsed. For example, if the TTL is one week, then the recovery module waits until a week has elapsed since it performed block 315. Doing so ensures that the edge servers have performed the revalidation process for all its cached objects at least once, and thus, would have refreshed any cached objects with non-matching tags.

In another embodiment, the recovery module can monitor the amount of network traffic associated with the revalidation requests, and when that traffic returns to a normal, historical average, assume that all the forced refreshes have been performed and move to the next batch.

In another embodiment, the recovery module can evaluate the value of the tags being sent in the revalidation requests. If the expected proportion of the tags in the revalidation request include the prefix being added to the tags to force a refresh (e.g., "G1"), then the recovery module knows that batch is finished. For example, if this is the first batch, and assuming each batch has 6.25% of the content in the CDN, then when 6.25% of the tags in the revalidation request has the prefix, the recovery module knows that batch is complete. If it is the second batch, then when approximately 12.5% of the tags in the revalidation requests have the prefix, then the recovery module knows that batch is complete, and so forth.

Further, the forced refresh can be performed in tandem with the normal revalidation process. For example, if one of the objects at the origin data center is updated, and the tag is changed, regardless if the updated object is part of the batch or not, the edge server can identify the tag has changed and download the updated object.

Assuming the current batch is complete, the method 300 proceeds to block 325 where the recovery module determines whether all the batches are complete. If not, the method proceeds to block 330 where the recovery module selects a different batch and repeats block 315 except this time modifying the tags for the new batch. Thus, the edge servers will forcibly refresh the objects in this batch while the objects in the previous batch are not refreshed (assuming they have not been updated at the origin).

When all batches have been forcibly refreshed, at block 335 the recovery module can continue to perform revalidation without forcibly refreshing the cached objects. That is, revalidation can continue to refresh any objects that are updated at the origin. Notably, as discussed above, this "normal" revalidation process can occur in parallel with forcible refreshing.

In one embodiment, the recovery module may repeat the method 300 in order to revert the modified tags back to their original values. This would entail performing another forcible refresh on the batches, but it would also revert the CDN back to its previous state with the original tags, and without any corrupted data. This may be preferred if the system administrator is worried the modified tags (e.g., adding the prefix) may cause issues later down the road. However, the system administrator may instead to prefer to leave the modified tags and let these tags be removed during the normal revalidation process when the objects are updated at the origin over time.

Figure 5:
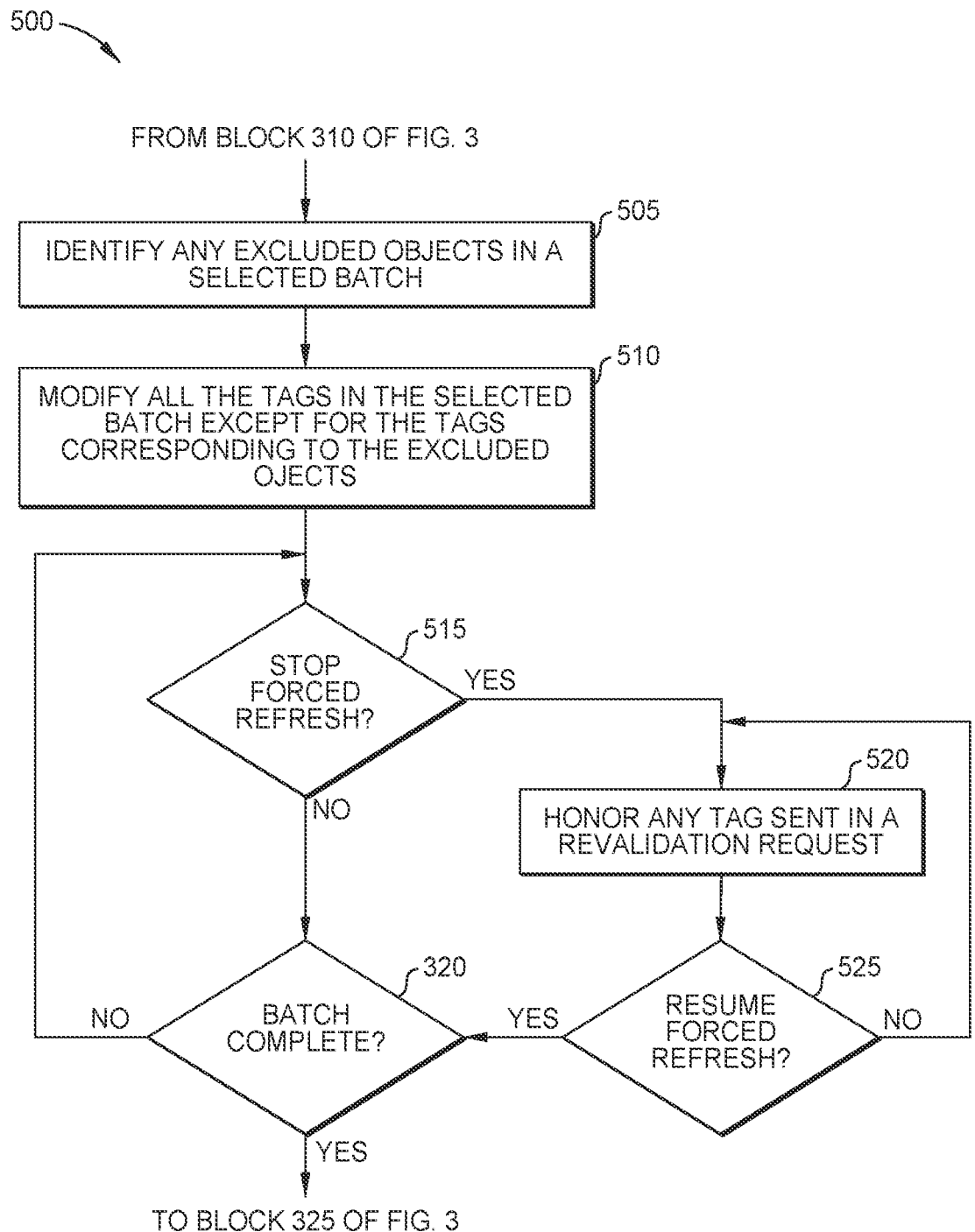
FIG. 5 is a flowchart for performing a forced refresh in batches, according to one embodiment.

FIG. 5 is a flowchart of a method 500 for performing a forced refresh in batches, according to one embodiment. As shown, the method 500 begins after block 310 of FIG. 3 where the recovery module subdivides the tags into a plurality of batches. At block 505, the recovery module identifies any objects in a selected batch that should be excluded from the forced refresh. For example, if the CDN is part of a media streaming service, the recovery module may not modify the tags for media assets that are in high demand (e.g., popular shows or new releases) to not interfere with the ability of the CDN to service user request for those assets. In another example, the recovery module may exclude any objects that were added to the CDN after the event that triggered the forced refresh occurred. For instance, if the recovery module determines that a network outage one week ago corrupted some objects, the recovery module may not perform a forced refresh on any objects added to the CDN since that time. Thus, the recovery module can select which objects in the CDN should, or should not, be subjected to a forced refresh.

In one embodiment, the recovery module can use a path or name of the objects to select which objects should be excluded from the forced refresh. For example, the objects corresponding to a particular movie or television show may all share the same path or name. Before modifying the tag of an object, the recovery module can check to determine whether its path or name matches one that was identified at block 505, and if so, not modify its tag.

At block 510, the recovery module modifies all the tags in the selected batch except the tags corresponding to the excluded objects. The tags can be modified using any of the techniques discussed above. Because the tags of the excluded objects are not forcibly changed, the edge servers will download a fresh copy of those objects during revalidation only if the objects were changed at the origin and given updated tags.

At block 515, when performing a forced refresh on the selected batch of objects, the recovery module can determine whether it should stop the forced refresh. For example, the recovery module can monitor the network traffic between the origin data center and the edge servers, or may monitor the compute usage rates in the origin data center to determine whether the forced refresh is overwhelming the network resources or the local resources in the origin data center. In another example, a system administrator can use the recovery module to stop the forced refresh.

If the forced refresh should be stopped, at block 520, the recovery module honors any tag sent in a revalidation request. That is, the recovery module can instruct the origin data center to respond to every revalidation request from an edge server by stating the tags match, even when they do not. Doing so stops the edge servers and the origin from performing any additional forced refresh, as well as the normal revalidations of updated content.

At block 525, the recovery module (or a system administrator) determines whether to resume forced refresh. For example, the recovery module may resume the forced refresh during a time when network demands have decreased (e.g., during early morning or late at night) or after additional compute resources have been spun up at the origin data center.

In another example, the recovery module may reduce the size of the selected batch. For example, the recovery module may change back the tags of some of the objects to their original values—i.e., roll back the modification at block 510—which effectively reduces the size of the batch. However, this may capture some objects that have already been forcibly refreshed which would then be refreshed again since the edge servers now store the modified tags rather than the original tags. Nonetheless, if the recovery module stopped the forced refresh at a time soon after the batch was started, this strategy may work for reducing the size of the batch and reduce the strain on the network or the resources of the origin.

After resuming the forced refresh, at block 320, the recovery module determines whether the batch is complete using any of the techniques discussed in FIG. 3. This batch could be the original batch selected at block 510, or a reduced sized batch that was implemented after the forced refresh was stopped. If the batch is complete, the method 500 proceeds to block 325 of FIG. 3 to determine whether all batches are complete, and if not, select a new batch. If the current batch is not complete, the method 500 returns to block 515 to continually monitor the forced refresh for the current batch to check whether it should be stopped.

In sum, the method 500 describes techniques to exclude certain objects from being forcibly refreshed, as well as stop a current batch in response to a network or computing issue.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   subdividing tags corresponding to objects in a content delivery network (CDN) to form a plurality of batches;
   modifying the tags in a first batch of the plurality of batches, wherein the modified tags are stored at an origin data center in the CDN;
   performing a forced refresh of the objects in the first batch as part of a revalidation process associated with edge servers in the CDN; and
   upon determining the first batch is complete, selecting and modifying the tags in a second batch of the plurality of batches to perform a forced refresh on the objects in the second batch.

2. The method of claim 1, further comprising:
   performing, after the tags of the second batch have been modified, the forced refresh on the second batch using the revalidation process initiated by the edge servers in the CDN.

3. The method of claim 1, wherein copies of the objects are stored at both the origin data center and the edge servers.

4. The method of claim 3, further comprising, before subdividing the tags:
   identifying potential corruption that causes the copies of the objects stored at the edge servers to not match the corresponding copies of the objects stored at the origin data center.

5. The method of claim 3, wherein the revalidation process comprises:
   receiving, at the origin data center, requests from the edge servers to determine whether tags for the copies of the objects stored at the edge servers match corresponding tags for the copies of the objects stored at the origin data center;
   upon determining the tags at the edge servers do not match the tags at the origin data center, refreshing the copies of the objects stored at the edge servers with the copies of the objects stored at the origin data center.

6. The method of claim 1, wherein subdividing the tags comprises:
   assigning tags with one of different least significant bit values or different most significant bit values into different ones of the plurality of batches.

7. The method of claim 1, wherein modifying the tags comprises:
   adding a new prefix or suffix to each of the tags in first batch, wherein the corresponding tags stored in the edge servers do not have the new prefix or suffix.

8. The method of claim 1, further comprising:
   identifying at least one object in the first batch to exclude from the forced refresh based on a path or name corresponding to the object, wherein the tag for the at least one object is not modified.

9. The method of claim 1, further comprising:
    determining to stop the forced refresh before the first batch is complete; and
    honoring any tag in a revalidation request received at the origin data center to stop the forced refresh.

10. A non-transitory computer readable medium containing computer program code that, when executed by operation of one or more computer processors, performs an operation comprising:
    subdividing tags corresponding to objects in a content delivery network (CDN) to form a plurality of batches;
    modifying the tags in a first batch of the plurality of batches, wherein the modified tags are stored at an origin data center in the CDN;
    performing a forced refresh of the objects in the first batch as part of a revalidation process initiated by edge servers in the CDN; and
    upon determining the first batch is complete, selecting and modifying the tags in a second batch of the plurality of batches to perform a forced refresh on the objects in the second batch.

11. The non-transitory computer readable medium of claim 10, the operation further comprising:
    performing, after the tags of the second batch have been modified, the forced refresh on the second batch using the revalidation process initiated by the edge servers in the CDN.

12. The non-transitory computer readable medium of claim 10, wherein copies of the objects are stored at both the origin data center and the edge servers.

13. The non-transitory computer readable medium of claim 12, the operation further comprising, before subdividing the tags:
    identifying potential corruption that causes the copies of the objects stored at the edge servers to not match the corresponding copies of the objects stored at the origin data center.

14. The non-transitory computer readable medium of claim 10, wherein subdividing the tags comprises:
    assigning tags with one of different least significant bit values or different most significant bit values into different ones of the plurality of batches.

15. The non-transitory computer readable medium of claim 10, wherein modifying the tags comprises:
    adding a new prefix or suffix to each of the tags in first batch, wherein the corresponding tags stored in the edge servers do not have the new prefix or suffix.

16. A system, comprising:
    a processor;
    memory comprising computer program code that, when executed by operation of one or more computer processors, performs an operation comprising:
        subdividing tags corresponding to objects in a content delivery network (CDN) to form a plurality of batches;
        modifying the tags in a first batch of the plurality of batches, wherein the modified tags are stored at an origin data center in the CDN;
        performing a forced refresh of the objects in the first batch as part of a revalidation process initiated by edge servers in the CDN; and
        upon determining the first batch is complete, selecting and modifying the tags in a second batch of the plurality of batches to perform a forced refresh on the objects in the second batch.

17. The system of claim 16, further comprising:
    performing, after the tags of the second batch have been modified, the forced refresh on the second batch using the revalidation process initiated by the edge servers in the CDN.

18. The system of claim 17, wherein copies of the objects are stored at both the origin data center and the edge servers, wherein the operation further comprises, before subdividing the tags:
    identifying potential corruption that causes the copies of the objects stored at the edge servers to not match the corresponding copies of the objects stored at the origin data center.

19. The system of claim 16, wherein subdividing the tags comprises:
    assigning tags with one of different least significant bit values or different most significant bit values into different ones of the plurality of batches.

20. The system of claim 16, wherein modifying the tags comprises:
    adding a new prefix or suffix to each of the tags in first batch, wherein the corresponding tags stored in the edge servers do not have the new prefix or suffix.

* * * * *

UNITED STATES PATENT AND TRADEMARK OFFICE
CERTIFICATE OF CORRECTION

PATENT NO. : 11,438,433 B1
APPLICATION NO. : 17/518764
DATED : September 6, 2022
INVENTOR(S) : Eric C. Friedrich et al.

It is certified that error appears in the above-identified patent and that said Letters Patent is hereby corrected as shown below:

In the Specification

In Column 4, Line 66, delete "1406" and insert -- 140B --.

In Column 5, Line 31, delete ""2000K"" and insert -- "200OK" --.

Signed and Sealed this
Twenty-second Day of November, 2022

Katherine Kelly Vidal
*Director of the United States Patent and Trademark Office*